United States Patent
Marks et al.

(10) Patent No.: US 10,131,305 B2
(45) Date of Patent: Nov. 20, 2018

(54) BUMPER ASSEMBLIES AND VEHICLES WITH INTEGRATED AIR DEFLECTORS

(71) Applicant: Toyota Motor Engineering & Manufacturing North America, Inc., Erlanger, KY (US)

(72) Inventors: Robert J. Marks, Ann Arbor, MI (US); David N. Evans, Ypsilanti, MI (US); Avinash S. Phadatare, Canton, MI (US); Jeremiah T. Hammer, Ann Arbor, MI (US)

(73) Assignee: TOYOTA MOTOR ENGINEERING & MANUFACTURING NORTH AMERICA, INC., Plano, TX (US)

( * ) Notice: Subject to any disclaimer, the term of this patent is extended or adjusted under 35 U.S.C. 154(b) by 11 days.

(21) Appl. No.: 15/428,827

(22) Filed: Feb. 9, 2017

(65) Prior Publication Data
US 2018/0222421 A1    Aug. 9, 2018

(51) Int. Cl.
*B60R 19/52* (2006.01)
*B60R 19/02* (2006.01)
*B60K 11/08* (2006.01)

(52) U.S. Cl.
CPC .............. *B60R 19/52* (2013.01); *B60K 11/08* (2013.01); *B60R 19/023* (2013.01)

(58) Field of Classification Search
CPC ........ B60R 2019/486; B60R 2019/527; B60K 11/08
USPC .............................. 180/68.1, 68.2, 68.4, 68.6
See application file for complete search history.

(56) References Cited

U.S. PATENT DOCUMENTS

| | | | |
|---|---|---|---|
| 4,050,689 A | 9/1977 | Barton et al. | |
| 5,326,133 A * | 7/1994 | Breed | B60R 19/483 180/274 |
| 5,478,127 A * | 12/1995 | Chase | B60K 11/08 180/68.6 |
| 5,573,299 A * | 11/1996 | Masuda | B60K 11/04 180/68.4 |
| 6,290,272 B1 | 9/2001 | Braun | |
| 6,527,317 B2 * | 3/2003 | Fox | B60R 19/52 180/68.6 |
| 6,702,343 B1 * | 3/2004 | Stull | B60R 19/52 180/68.6 |

(Continued)

FOREIGN PATENT DOCUMENTS

| CN | 101020441 A | 8/2007 |
|---|---|---|
| CN | 202557460 U | 11/2012 |

(Continued)

*Primary Examiner* — Jeffrey J Restifo
(74) *Attorney, Agent, or Firm* — Dinsmore & Shohl LLP

(57) ABSTRACT

A bumper assembly includes a bumper cover including one or more air deflectors extending inward from the bumper cover, a bumper reinforcement beam positioned rearward of the bumper cover, and a low speed bumper energy absorber that extends along a front surface of the bumper reinforcement beam between the bumper cover and the bumper reinforcement beam. The one or more air deflectors extend from the bumper cover toward the low speed bumper energy absorber at an oblique angle relative to a front face of the low speed bumper energy absorber to substantially isolate a portion of the bumper assembly from air leakage through the bumper assembly.

20 Claims, 6 Drawing Sheets

(56) References Cited

U.S. PATENT DOCUMENTS

| | | | |
|---|---|---|---|
| 6,874,831 B1* | 4/2005 | Pouget | B60R 19/12 293/115 |
| 6,957,837 B2* | 10/2005 | Stull | B60R 19/52 180/68.6 |
| 7,013,951 B2* | 3/2006 | Bauer | B60K 11/08 165/41 |
| 7,025,396 B2 | 4/2006 | Omura et al. | |
| 7,249,662 B2 | 7/2007 | Itou | |
| 7,410,018 B2* | 8/2008 | Satou | B60R 19/12 180/68.4 |
| 7,438,348 B2* | 10/2008 | Nakamae | B62D 21/152 180/68.6 |
| 7,455,351 B2* | 11/2008 | Nakayama | B60R 19/52 180/68.6 |
| 7,516,994 B2 | 4/2009 | Ito | |
| 7,552,898 B2* | 6/2009 | Demange | B60R 19/483 248/27.3 |
| 7,699,383 B2 | 4/2010 | Fukukawa et al. | |
| 7,823,959 B2 | 11/2010 | Wallman et al. | |
| 8,191,664 B2* | 6/2012 | Steller | B60K 11/04 180/68.4 |
| 8,220,576 B2* | 7/2012 | Terada | B62D 21/152 180/68.4 |
| 8,246,105 B2* | 8/2012 | Mildner | B60K 11/04 180/274 |
| 8,267,209 B2* | 9/2012 | Kuwabara | B60K 11/04 123/41.48 |
| 8,403,403 B2* | 3/2013 | Tashiro | B60R 19/02 180/68.4 |
| 8,645,028 B2* | 2/2014 | Mochizuki | B60K 11/085 123/41.05 |
| 8,646,552 B2* | 2/2014 | Evans | B60K 11/085 180/68.1 |
| 8,702,157 B2* | 4/2014 | Hirose | B60R 19/52 180/68.6 |
| 8,919,864 B2* | 12/2014 | Kojima | B60K 11/085 180/68.1 |
| 9,010,844 B2* | 4/2015 | Hasegawa | B62D 25/082 180/68.1 |
| 9,056,634 B2* | 6/2015 | Watanabe | B62D 21/152 |
| 9,254,812 B2 | 2/2016 | Tashiro et al. | |
| 2002/0096378 A1* | 7/2002 | Kobayashi | B60K 11/08 180/68.6 |
| 2002/0129981 A1* | 9/2002 | Satou | B60R 19/12 180/68.6 |
| 2006/0102109 A1* | 5/2006 | Becker | B60K 11/08 123/41.48 |
| 2007/0222238 A1* | 9/2007 | Kobayashi | B29C 45/0081 293/115 |
| 2008/0277951 A1* | 11/2008 | Rathje | B60R 19/12 293/115 |
| 2010/0102580 A1 | 4/2010 | Brooks et al. | |
| 2010/0243351 A1* | 9/2010 | Sakai | B60K 11/085 180/68.1 |
| 2010/0282533 A1* | 11/2010 | Sugiyama | B60K 11/085 180/68.1 |
| 2011/0140464 A1* | 6/2011 | Mildner | B60K 11/04 293/115 |
| 2012/0032458 A1 | 2/2012 | Brooks et al. | |
| 2012/0248824 A1* | 10/2012 | Fujiu | B60K 11/08 296/208 |
| 2014/0084608 A1* | 3/2014 | Hasegawa | B60R 19/12 293/132 |
| 2014/0090911 A1* | 4/2014 | Oota | B60K 11/085 180/68.1 |
| 2014/0291056 A1* | 10/2014 | Takanaga | B60K 11/085 180/274 |
| 2015/0298540 A1* | 10/2015 | Matsubara | B60K 13/02 293/113 |
| 2016/0193977 A1* | 7/2016 | Calleja | B60R 19/12 293/115 |
| 2016/0207482 A1 | 7/2016 | Tachibana et al. | |

FOREIGN PATENT DOCUMENTS

| | | |
|---|---|---|
| DE | 102012217648 A1 | 5/2014 |
| DE | 102006030504 B4 | 7/2015 |
| DE | 102014203512 A1 | 8/2015 |

\* cited by examiner

BUMPER ASSEMBLIES AND VEHICLES WITH INTEGRATED AIR DEFLECTORS

TECHNICAL FIELD

The present specification generally relates to bumper assemblies and vehicles having integrated air deflectors and, more specifically, to bumper assemblies and vehicles having energy absorbers with integrated air deflectors.

BACKGROUND

Vehicles are often equipped with bumper assemblies that include energy absorbing structures. These energy absorbing structures are generally configured to deform or deflect in a predetermined manner to absorb the energy of an impact. However, openings between the various energy absorbing structures may allow air to pass through the bumper structure around a radiator of the vehicle instead of air passing through the radiator, leading to inefficient heating and cooling of an engine compartment of the vehicle.

Accordingly, a need exists for alternative bumper assemblies and vehicles having energy absorbers with integrated air deflectors.

SUMMARY

In one embodiment, a bumper assembly may include a bumper cover including one or more air deflectors extending inward from the bumper cover, a bumper reinforcement beam positioned rearward of the bumper cover, and a low speed bumper energy absorber that extends along a front surface of the bumper reinforcement beam between the bumper cover and the bumper reinforcement beam. The one or more air deflectors extend from the bumper cover toward the low speed bumper energy absorber at an oblique angle relative to a front face of the low speed bumper energy absorber to substantially isolate a portion of the bumper assembly from air leakage through the bumper assembly.

In another embodiment, a vehicle may include an engine compartment, a radiator dividing the engine compartment into a hot section and a cool section, and a bumper assembly extending forward of the cool section in a vehicle longitudinal direction. The bumper assembly may include a bumper cover including one or more air deflectors extending inward from the bumper cover in a vehicle longitudinal direction, a bumper reinforcement beam positioned rearward of the bumper cover in a vehicle longitudinal direction, and a low speed bumper energy absorber that extends along a front surface of the bumper reinforcement beam between the bumper cover and the bumper reinforcement beam. The one or more air deflectors extend from the bumper cover toward the low speed bumper energy absorber at an oblique angle relative to a front face of the low speed bumper energy absorber to substantially isolate a portion of the bumper assembly from air leakage through the bumper assembly in a vehicle lateral direction.

In yet another embodiment, a vehicle may include an engine compartment, a radiator dividing the engine compartment into a hot section and a cool section, and a bumper assembly extending forward of the cool section in a vehicle longitudinal direction. The bumper assembly may include a bumper cover including an air deflector extending inward from the bumper cover in the vehicle longitudinal direction, a headlamp, a bumper reinforcement beam positioned rearward of the bumper cover in a vehicle longitudinal direction, and a low speed bumper energy absorber that extends along a front surface of the bumper reinforcement beam between the bumper cover and the bumper reinforcement beam. The air deflector is positioned outboard of the radiator and inboard of the headlamp. The air deflector extends from the bumper cover toward the low speed bumper energy absorber at an oblique angle relative to a front face of the low speed bumper energy absorber to substantially isolate a portion of the bumper assembly from air leakage through the bumper assembly in a vehicle lateral direction.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

FIG. 3D schematically depicts the deformation of the bumper assembly of FIG. 5A during a collision at 7 ms, according to one or more embodiments shown and described herein; and FIG. SE schematically depicts the deformation of the bumper assembly of FIG. 5A during a collision at 11 ms, according to one or more embodiments shown and described herein.

DETAILED DESCRIPTION

Embodiments disclosed herein include bumper assemblies and vehicles having integrated air deflectors. Referring generally to the figures, a bumper assembly according to the present disclosure may include a bumper cover including one or more air deflectors extending inward from the bumper cover, a bumper reinforcement beam positioned rearward of the bumper cover, and a low speed bumper energy absorber that extends along a front surface of the bumper reinforcement beam between the bumper cover and the bumper reinforcement beam. The one or more air deflectors may extend from the bumper cover toward the low speed bumper energy absorber at an oblique angle relative to a front face of the low speed bumper energy absorber to substantially isolate a portion of the bumper assembly from air leakage through the bumper assembly. By substantially preventing air from passing through the bumper assembly, air that enters the bumper assembly, such as through a grille of the bumper assembly, is forced to flow directly through a radiator of the vehicle instead of being diverted into other pathways provided by the bumper assembly. This may lead to greater efficiency in cooling an engine compartment of the vehicle. Various embodiments of bumper assemblies and vehicles including these integrated air deflectors are described in detail below.

Figure 1:
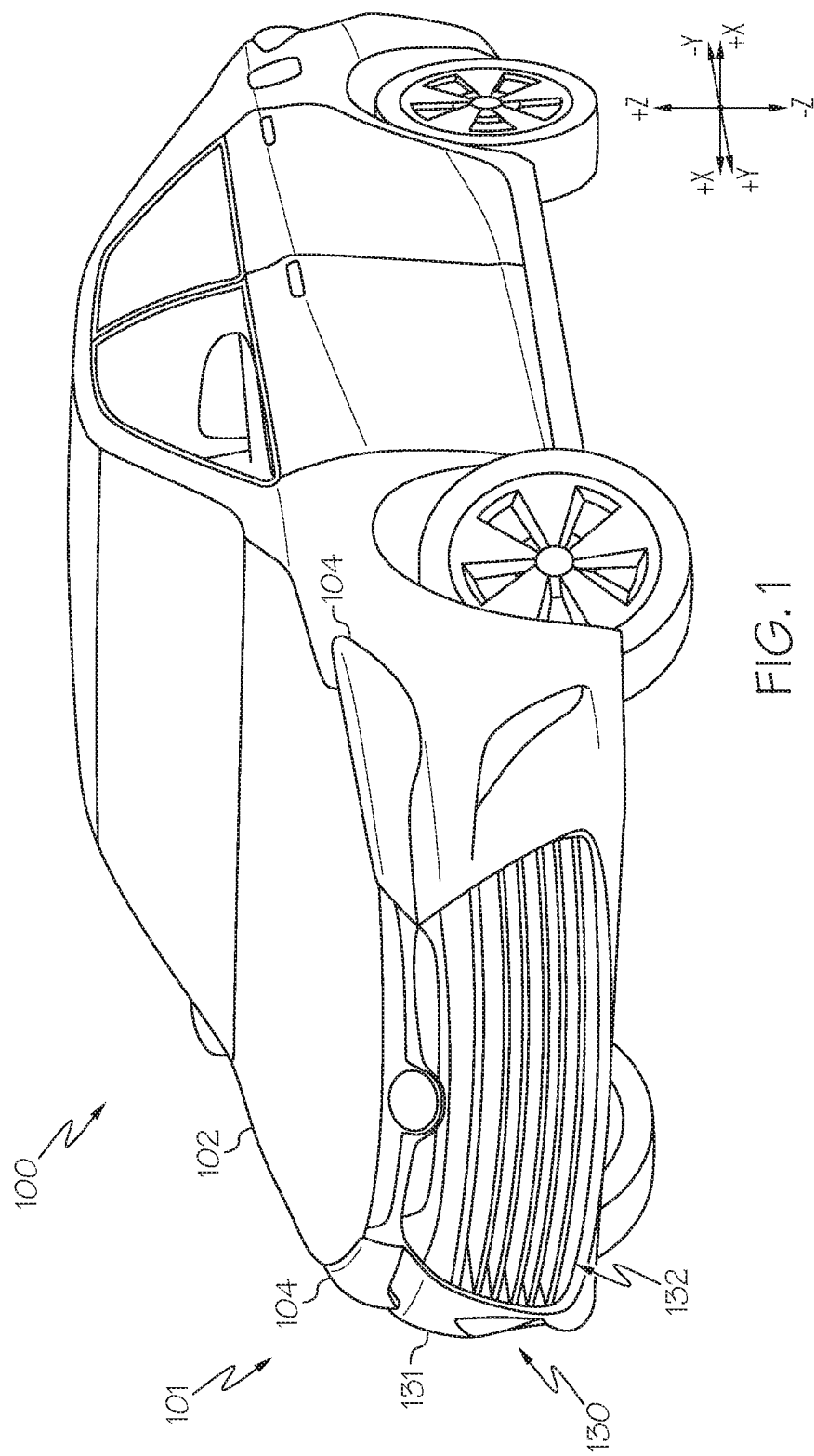
FIG. 1 depicts a perspective view of a vehicle, according to one or more embodiments shown and described herein.

Referring now to FIG. 1, a perspective view of a vehicle 100 is generally depicted. The vehicle 100 generally includes a hood 102 extending over an engine compartment 120 (shown in FIG. 2) and a bumper assembly 130 extending across a front portion 101 of the vehicle 100. An exterior of the bumper assembly 130 generally includes a bumper cover 131 defining the external fascia of the bumper assembly 130. The bumper cover 131 may include a grille 132 to allow air to flow from an external environment of the vehicle 100 to an interior of the engine compartment 120 to aid in cooling the engine compartment 120. The bumper assembly 130 may further include headlamps 104 positioned within the bumper cover 131 on either side of the vehicle 100. For instance, a headlamp 104 may be positioned on a passenger side of the vehicle 100 and a headlamp 104 may be positioned on a driver side of the vehicle 100.

It is noted that while the vehicle 100 is depicted as an automobile, the vehicle 100 may be any passenger vehicle such as, for example, a terrestrial, aquatic, and/or airborne vehicle. Furthermore, vehicles according to the present disclosure may include a variety of construction methodologies that are conventionally known, including a unibody construction methodology as well as a body-on-frame construction methodology. A unibody construction includes a plurality of structural members that jointly defines a passenger cabin of the vehicle 100 and provides structural mounts for a vehicle drive train and a suspension. In contrast, body-on-frame construction includes a cabin that generally supports the body panels of the vehicle 100 and that defines the passenger cabin of the vehicle 100. In a body-on-frame construction, the cabin is attached to a frame that provides structural support to the drive train and suspension of the vehicle 100. It should be understood that vehicles that are constructed with either unibody construction or body-on-frame construction may incorporate the elements that are shown and described herein.

As used herein, the term "vehicle longitudinal direction" refers to the forward-rearward direction of the vehicle 100 (i.e., in the +/− vehicle V-direction depicted in FIG. 1). The term "vehicle lateral direction" refers to the cross-vehicle direction of the vehicle 100 (i.e., in the +/− vehicle X-direction depicted in FIG. 1), and is transverse to the vehicle longitudinal direction. The term "vehicle vertical direction" refers to the bottom-top direction of the vehicle 100 (i.e., in the +/− vehicle Z-direction depicted in FIG. 1), and is transverse to the vehicle longitudinal direction and the vehicle lateral direction. Further, the terms "inboard" and "outboard" are used to describe the relative positioning of various components of the vehicle 100. The term "outboard" as used herein refers to the relative location of a component in direction toward an outer surface of the vehicle 100 in the vehicle lateral direction from a centerline 112 of the vehicle 100 (see FIG. 4). The term "inboard" as used herein refers to the relative location toward the centerline 112 of the vehicle 100 in the vehicle lateral direction.

Figure 2:
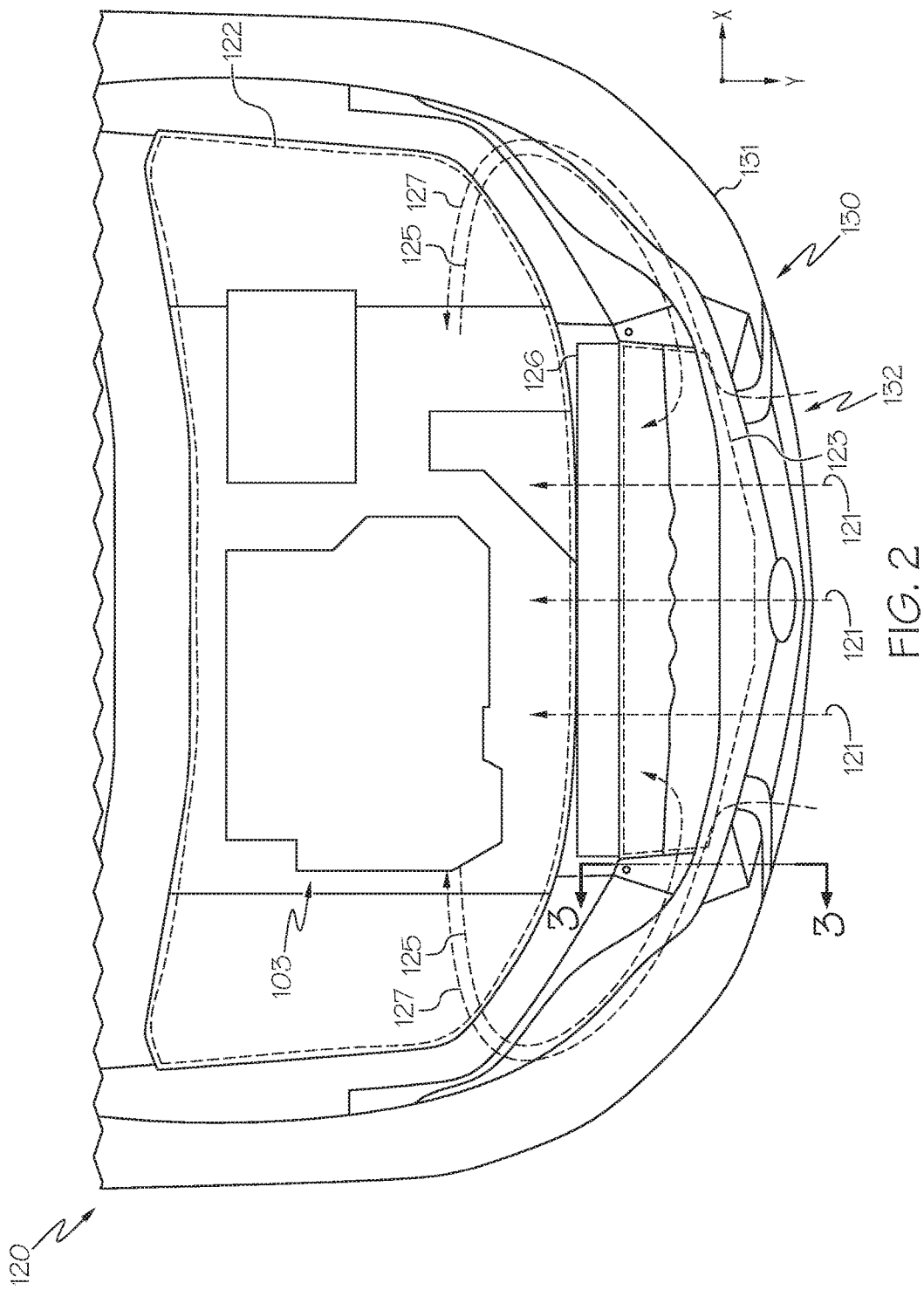
FIG. 2 depicts a schematic view of an engine compartment of the vehicle of FIG. 1, according to one or more embodiments shown and described herein.

Referring next to FIG. 2, the engine compartment 120 of the vehicle 100 is schematically illustrated. The engine compartment 120 is generally located beneath the hood 102 which houses the engine 103 and other operational components of the vehicle 100. The placement of a radiator 126 within the engine compartment 120 at the front end of vehicle 100 is shown in simplified form.

The radiator 126 generally divides the engine compartment 120 into a hot section 122 and a cool section 123. The hot section 122 is generally the portion of the engine compartment 120 housing the majority of the heat-producing components (e.g., the engine 103). The heat producing components cause the hot section 122 to be at a higher temperature than the cool section 123 due to heat generated by the heat-producing components. The cool section 123 generally refers to the portion of the engine compartment 120 between the bumper cover 131 and the radiator 126. To provide cooling air flow to the engine compartment 120 of the vehicle 100, cooling air 121 (illustrated by three arrows) travels through the grille 132 (shown in FIG. 1) of the engine cover 131 where it is directed through the cool section 123 and the radiator 126 and into the hot section 122 of the engine compartment 120. The heat from coolant (not shown) flowing within the radiator 126 is exchanged with the cooling air 121.

In vehicles not having integrated air deflectors as described herein, during a driving condition (e.g., when the vehicle 100 is in motion), the hot section 122 of the engine compartment 120 may be at a higher pressure than air at the grille 132 or within the cool section 123. In such instances, air (represented by arrow 125) may leak from the hot section 122 through various gaps within the bumper assembly 130 and back into the cool section 123, as illustrated by arrow 127, where the air is again passed through the radiator 126. This recirculation of air from the hot section 122 to the cool section 123 could potentially lower the efficiency of the engine 103 and the vehicle HVAC systems due to the higher temperature air being re-circulated.

Furthermore, in vehicles not having integrated air deflectors as described herein, during an idle condition (e.g., when the vehicle 100 is not moving), an opposite effect to the vehicle 100 in the driving condition may be had. Specifically, the cool section 123 may experience higher pressures from air being forced in from the grille 132. When the cool section 123 is at a higher pressure, air (represented by arrow 127) can leak through the various gaps of the bumper assembly 130, around the radiator 126 and into the hot section 122 of the engine compartment 120. Hence, the radiator 126 may not receive some of the air flow entering through the grille 132. This could lead the radiator 126 to be less efficient at cooling the coolant which flows therethrough.

The various gaps described above may include gaps within the bumper assembly 130 such as around the headlamps 104 (shown in FIG. 1) of the vehicle 100. For example, and not as a limitation gaps may be present beneath the headlamps 104 and the low force energy absorber 160 (shown in FIG. 3) in the vehicle vertical direction. Such gaps allow air to pass through such that the optimum pathways (e.g., through the radiator 126) are not taken. Hence, as will be described in greater detail below, the bumper assembly 130 may include integrated air deflectors positioned to block the gaps and prevent air leakage through the bumper assembly 130 in the vehicle lateral direction, and, more specifically, to prevent air leakage through gaps within the bumper assembly 130 at positions outboard (to either side) of the radiator 126.

Figure 3:
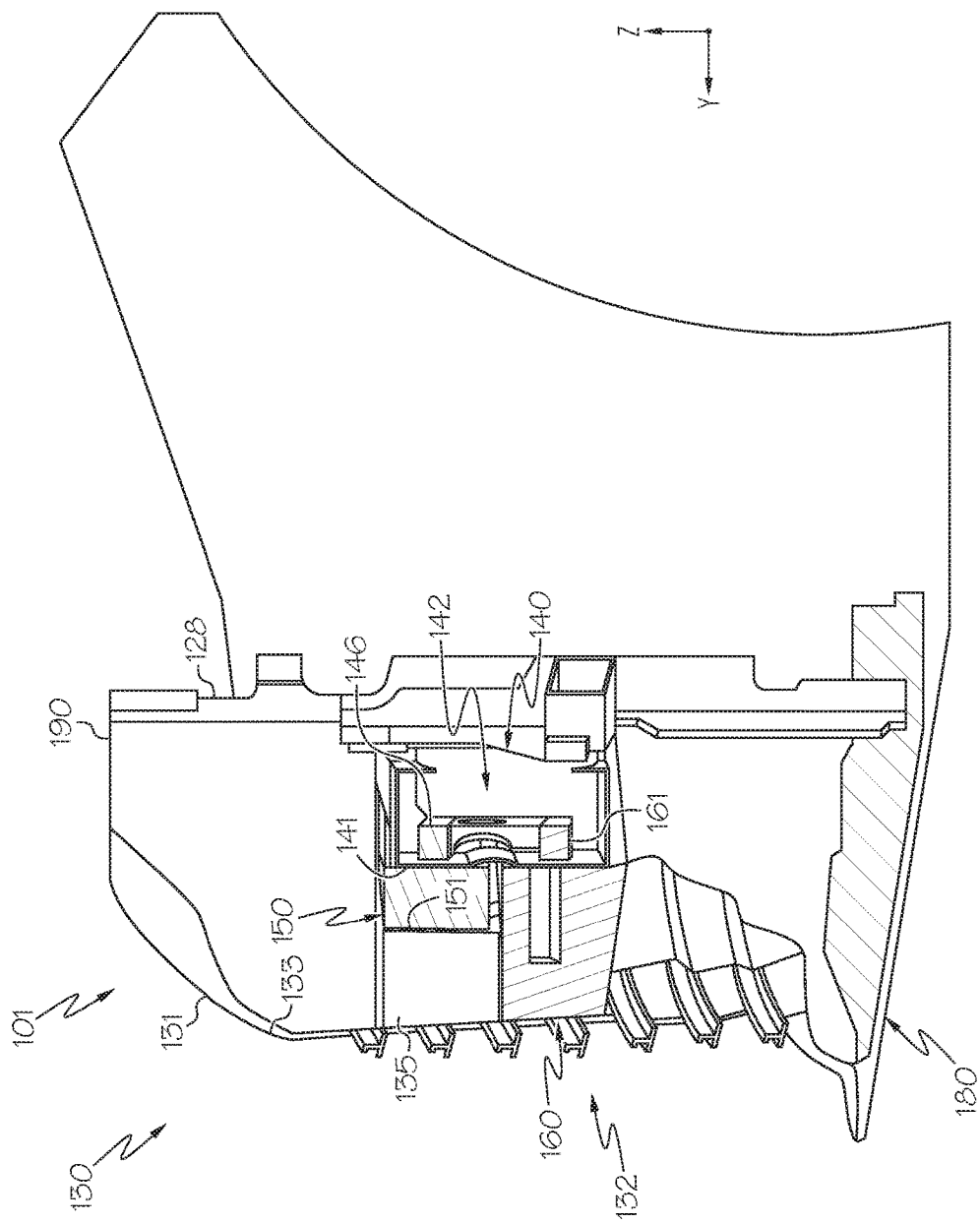
FIG. 3 depicts a cross-sectional view of a bumper assembly of the vehicle of FIG. 1, according to one or more embodiments shown and described herein.

Referring now to FIG. 3, a cross sectional view of the bumper assembly 130 taken at line 3-3 from FIG. 2 is generally depicted. As illustrated, the bumper assembly 130 includes the bumper cover 131, a bumper reinforcement beam 140, a low speed bumper energy absorber 150, and a low force energy absorber 160. In some embodiments, the bumper assembly 130 further includes an upper air deflector 190 and a high force energy absorber 180.

The bumper cover 131, or fascia, is an outer covering for covering the various components of the bumper assembly 130 (e.g., the bumper reinforcement beam 140, the low speed bumper energy absorber 150, the low force energy absorber 160, the upper air deflector 190, the high force energy absorber 180, and the like). Referring briefly to FIG. 1, the bumper cover 131 also includes openings for the headlamps 104 to shine therethrough. The bumper cover 131 may generally define a front end of the vehicle 100, and may have various styling elements for the aesthetic appeal of the vehicle 100. The bumper cover 131 may include a grille 132 that provides an opening or openings through the bumper cover 131 for air to pass into an interior of the engine compartment 120. As would be familiar to one of ordinary skill in the art, the bumper cover 131 is configured deform in response to a collision, thereby absorbing part of the impact to the vehicle 100. The bumper cover 131 may comprise a material which is able to flex and deform in response to a collision. For example, a flexible polymeric material may be used with or without a metal material for support.

Extending from an interior surface 133 of the bumper cover 131 are one or more air deflectors 135. The one or more air deflectors 135 may be narrow protrusions extending between the interior surface 133 of the bumper cover 131 and the low speed bumper energy absorber 150. The one or more air deflectors 135 may be molded into the interior surface 133 of the bumper cover 131. In other embodiments, the one or more air deflectors 135 may be a separate piece coupled to the interior surface 133 of the bumper cover 131 through convention methods (e.g., adhesives, fasteners, and the like). The one or more air deflectors 135 may be made from the same material as the bumper cover 131. For example, and not as a limitation, the one or more air deflectors 135 may be made from plastic or a flexible polymeric material. In other embodiments, the one or more air deflectors 135 may be made from a different material than the bumper cover 131. For example, the one or more air deflectors 135 may be made from a compressible material such as expanded polypropylene. The one or more air deflectors 135 may be made of a material that is compressible by about 75% to about 95%. By using a compressible material, the one or more air deflectors 135 may be substantially flattened during the event of an impact to the bumper cover 131 such that the one or more air deflectors 135 do not add a significant amount of material between the bumper cover 131 and the low speed bumper energy absorber 150. The one or more air deflectors 135 will be described in greater detail in relation to the other components of the bumper assembly 130.

Figure 4:
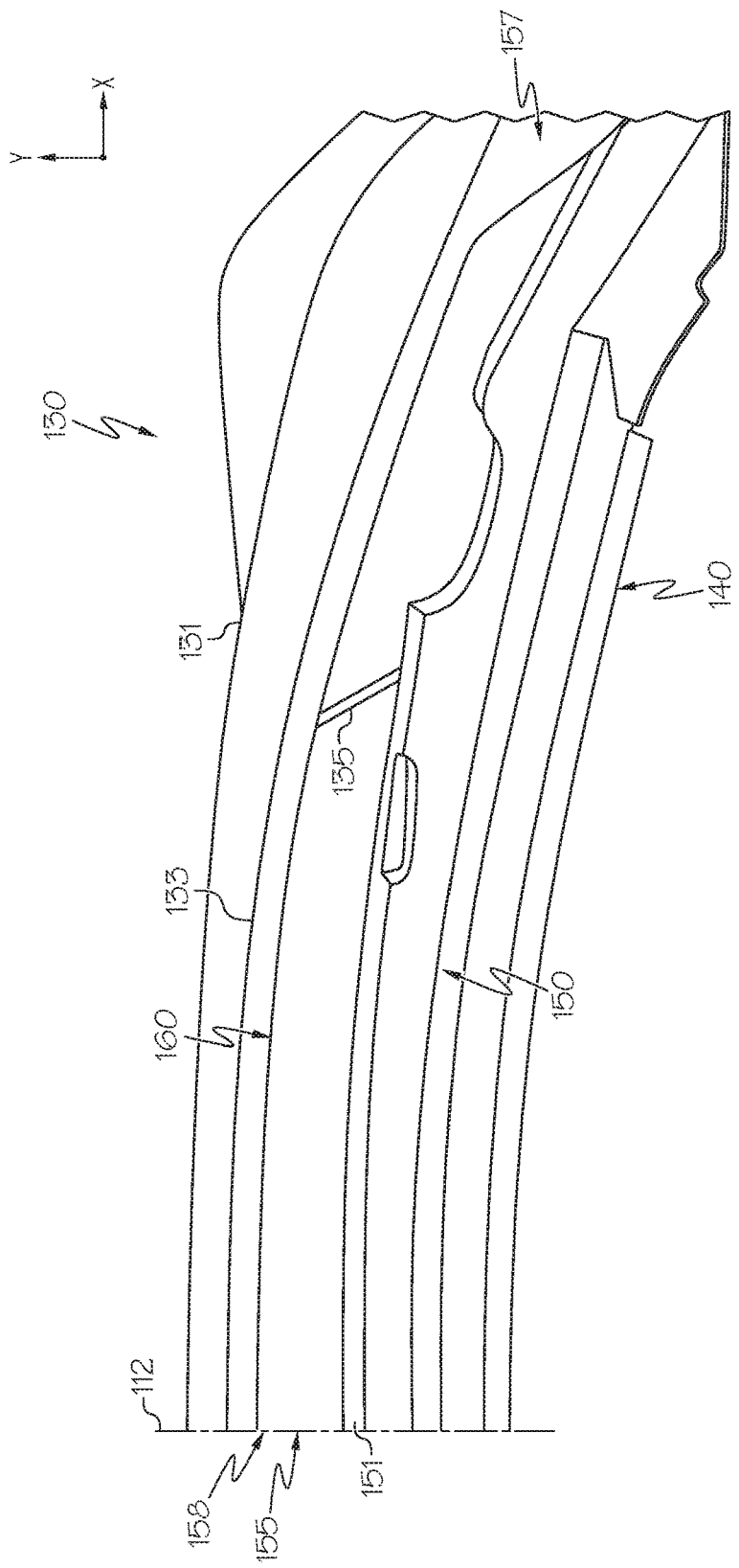
FIG. 4 depicts a top view of a portion of the bumper assembly of FIG. 3, according to one or more embodiments shown and described herein.

Still referring to FIG. 3, the bumper reinforcement beam 140 extends laterally across the vehicle 100 in the vehicle lateral direction. The bumper reinforcement beam 140 may be spaced apart from the bumper cover 131 in a vehicle longitudinal direction. Referring to FIG. 4, FIG. 4 schematically illustrates a top view of the bumper assembly 130 displaying only the bumper cover 131, the bumper reinforcement beam 140, the low speed bumper energy absorber 150, and the low force energy absorber 160. Centerline 112 indicates a centerline 112 of the vehicle 100. The bumper assembly 130 may be generally symmetrical about the centerline 112 such that the other half of the bumper assembly 130 mirrors what is shown in FIG. 4. As illustrated in FIG. 4, the bumper reinforcement beam 140 may comprise a curved shape to accommodate the contours of the vehicle body and to generally conform to the shape of the bumper cover 131.

Referring again to FIG. 3, the bumper reinforcement beam 140 may comprise a front surface 141 directed toward the bumper cover 131 in the vehicle longitudinal direction. The bumper reinforcement beam 140 may have an interlocking structure 142 to receive portions of other bumper assembly structures (e.g., the low speed bumper energy absorber 150 and the low force energy absorber 160) to fix such structures within the bumper assembly 130. In other embodiments there may be no interlocking structure 142. Furthermore, in some embodiments, in addition to or in place of the interlocking structure 142, adhesives, fasteners, welding, brazing, or other conventional methods may be used to couple the various components of the bumper assembly 130 to one another.

In general, the bumper reinforcement beam 140 may strengthen the bumper assembly 130 of the vehicle 100 to provide greater resistance in the case of a vehicle collision, and to reduce energy transfer from a collision to the various operational components of the vehicle 100 (e.g., components held within the engine compartment 120) and a passenger cabin of the vehicle 100. Many materials are contemplated for the bumper reinforcement beam 140 including, for example, a rigid metal material, such as steel (e.g., M-190 high strength steel).

As noted above, various energy absorbers may be provided within the bumper assembly 130. Specifically, the energy absorbers may be made of materials designed to deform under pressure to absorb and or direct energy in the event of a collision. Such materials generally include plastics or foams (e.g., expanded polypropylene). The strength (or resistance to deformation) of the materials chosen for a particular energy absorber may be chosen based on design criteria and the desired energy absorption.

Referring still to FIG. 3, the low speed bumper energy absorber 150 is positioned forward of the bumper reinforcement beam 140 in the vehicle longitudinal direction and extends along the front surface 141 of the bumper reinforcement beam 140 in the vehicle lateral direction. The low speed bumper energy absorber 150 may be coupled to the bumper reinforcement beam 140 through the interlocking structure 142, wherein an interlocking portion 146 of the low speed bumper energy absorber 150 extends through the bumper reinforcement beam 140 to be coupled to the interlocking structure 142 and/or by other conventional coupling methods (e.g., fasteners, adhesives, etc.). As such, the low force energy absorber 160 extends from the front surface 141 of the bumper reinforcement beam 140 to the bumper cover 131 in the vehicle longitudinal direction.

The low speed bumper energy absorber 150 further acts to absorb and direct energy from a vehicle collision. In particular, the low speed bumper energy absorber 150 is designed to absorb energy during low speed vehicle-to-vehicle collisions. The low speed bumper energy absorber 150 may be made from a variety of materials including plastic or foam (e.g., expanded polypropylene). In some embodiments, the material of the low speed bumper energy absorber 150 may be made of a material capable of compressing about 45% to about 65%. In some cases the material of the low speed bumper energy absorber 150 may be capable of compressing about 50% to about 60%. In some embodiments, the low speed bumper energy absorber 150 may be made from multiple materials having different compressive capabilities. The low speed bumper energy absorber 150 may be produced through any conventional forming process. For example, the low speed bumper energy absorber 150 may be made through an injection molding process.

The low speed bumper energy absorber 150 comprises a front face 151 directed toward bumper cover 131 in the vehicle longitudinal direction. At least a portion of low speed bumper energy absorber 150 is spaced from the bumper cover 131. The front face 151 of the low speed bumper energy absorber 150 may be spaced apart from the bumper cover 131. As such, an open space 155 (shown in FIG. 4) may exist between the bumper cover 131 and the front face 151 of the low speed bumper energy absorber 150. By providing some spacing between the front face 151 of the low speed bumper energy absorber 150 and the bumper cover 131, in the event of a collision, the bumper cover 131 may experience additional deformation to absorb some of the energy of an impact prior to contact with the low speed bumper energy absorber 150.

Referring now to FIG. 4, FIG. 4 illustrates the bumper cover 131, the bumper reinforcement beam 140, the low speed bumper energy absorber 150, and the low force energy absorber 160 in isolation from the rest of the bumper assembly 130. Furthermore, only half of the bumper assembly 130 is shown. As noted above, the bumper assembly 130 may be generally symmetrical about the centerline 112. Therefore, though only one air deflector 135 is shown, the bumper assembly 130 may include a second air deflector. As such, in some embodiments, there are two air deflectors 135. The air deflectors 135 may substantially close off (or isolate) outboard open spaces 157 on the passenger and driver sides of the vehicle 100, which are bounded by the air deflector 135, the low speed bumper energy absorber 150, and the bumper cover 131, from air flow. As such, air flow coming through the grille 132 (shown in FIG. 1) of the bumper cover 131 may be substantially isolated to a center opening 158 of the open space 155 between the air deflectors 135. As such, in some embodiments, there is a first air deflector 135 positioned on a driver side of the vehicle 100 (e.g., to a driver side of the grille 132 in the vehicle lateral direction) and a second air deflector positioned on the passenger side of the vehicle 100 (e.g., to the passenger side of the grille 132 in the vehicle lateral direction). The first and second air deflectors 135 maybe positioned outboard of the grille 132 and inboard of the headlamps 104 (illustrated in FIG. 1). In some embodiments, the one or more air deflectors 135 may be positioned inboard of only a portion of the grille 132. In some embodiments, the first and second air deflectors 135 may be positioned outboard of the radiator 126 (illustrated in FIG. 2) and inboard of the headlamps 104.

The one or more air deflectors 135 may be positioned at an oblique angle relative to a front face 151 of the low speed bumper energy absorber 150. The one or more air deflectors 135 may be angled either toward the centerline 112 of the vehicle 100 or outboard of the centerline 112. In FIG. 4, the air deflector 135 is shown angled outboard of the centerline 112 of the vehicle 100. By being angled relative to the front face 151 of the low speed bumper energy absorber 150, the one or more air deflectors 135 are configured to deform to absorb energy from an impact and slip passed the front face 151 of the low speed bumper energy absorber 150. This concept is illustrated in FIGS. 5A-5E. In other embodiments, the one or more air deflectors 135 may be substantially perpendicular to a front face 151 of the low speed bumper energy absorber 150. The one or more air deflectors 135 may extend the entire distance between the interior surface 133 of the bumper cover 131 and the front face 151 of the low speed bumper energy absorber 150 to contact the low speed bumper energy absorber 150. In other embodiments, the one or more air deflectors 135 may only extend across a portion of the distance between the interior surface 133 of the bumper cover 131 and the front face 151 of the low speed bumper energy absorber 150.

As noted above, the one or more air deflectors 135 are thin protrusions in some embodiments. For example, the one or more air deflectors 135 may have a width of less than about 50 mm, about 30, mm, about 10 mm, or the like. In some embodiments the one or more air deflectors 135 may only be about 0.5 mm to about 5 mm thick (e.g., about 1 mm to about 2 mm thick). Though the one or more air deflectors 135 are generally shown as having a rectangular cross-section, other cross-sections are contemplated. In some embodiments, the one or more air deflectors 135 may be thicker where the one or more air deflectors 135 intersect with the bumper cover 131 and thinner at a distal end. For example, thickness of the one or more air deflectors 135 at the front face 151 of the low speed bumper energy absorber 150 may between about 0.5 mm to about 1.5 mm (e.g., 1 mm), while the thickness of the one or more air deflectors 135 at the distal end may be about 1.5 mm to about 2.5 mm (e.g., 2 mm).

As noted above, the low speed bumper energy absorber 150 may be formed of a material capable of compressing about 45% to about 65% (e.g., expanded polypropylene) and the one or more air deflectors 135 may be formed of a material capable of compressing about 75% to about 95%. By making the one or more air deflectors 135 from a lower density material than the low speed bumper energy absorber 150, stack-up during the event of a collision may be reduced. Stack-up refers to the one or more air deflectors 135 bending in front of the front face 151 of the low speed bumper energy absorber 150, which puts more material between the front face 151 of the low speed bumper energy absorber 150 and the bumper cover 131. This stack-up may lead to faster bottoming out of the deformation of the bumper cover 131 towards the low speed bumper energy absorber 150. By making the one or more air deflectors 135 from a highly compressible material, any additional forces caused from stack-up may be reduced. In other embodiments, the one or more air deflectors may be made out of plastic.

Referring again to FIG. 3, the one or more air deflectors 135 may be vertically aligned with the upper air deflector 190. In some embodiments, the one or more air deflectors 135 may be vertically offset from the upper air deflector 190. The upper air deflector 190 may substantially block an upper portion of the bumper assembly 130 (e.g., such portion being above the vertical height of the low speed bumper energy absorber 150) from air flow. Such upper air deflector 190 may be made from foam, plastic, or a combination thereof. The upper air deflector 190 may be positioned inboard of the headlamp 104 and outboard of the cool section 123. As such, there may be two upper air deflectors 190 positioned to either side of the radiator 126. The upper air deflector 190 may be coupled to a radiator support 128 of the radiator 126. It is contemplated that in some embodiments, there may not he a separate upper air deflector 190 and, instead, the one or more air deflectors 135 may extend vertically upward to close off the upper portion of the bumper assembly 130.

Still referring to FIG. 3, positioned directly beneath the low speed bumper energy absorber 150 in the vehicle vertical direction may be the low force energy absorber 160. The low force energy absorber 160 extends in the vehicle lateral direction across the bumper assembly 130. The low force energy absorber 160 may be coupled to the bumper reinforcement beam 140 through the interlocking structure 142, wherein an interlocking portion 161 of the low force energy absorber 160 extends through the bumper reinforcement beam 140 to be coupled to the interlocking structure 142 and/or by other conventional coupling methods (e.g., fasteners, adhesives, and the like). As such, the low force energy absorber 160 extends from the front surface 141 of the bumper reinforcement beam 140, forward of the front face 151 of the low speed bumper energy absorber 150, to the bumper cover 131 in the vehicle longitudinal direction. Though FIG. 3 illustrates some spacing between the low force energy absorber 160 and the one or more air deflectors 135, there may not be any spacing between the low force energy absorber 160 and the one or more air deflectors 135. As such, the one or more air deflectors 135 may extend from contact with the low force energy absorber 160 up to contact with the upper air deflector 190 in the vehicle vertical direction. The low force energy absorber 160 may be made of any material configured to deform in the event of a collision. In some embodiments, the low force energy absorber 160 is made from a compressible material (e.g., foam such as expanded polypropylene) capable of compressing about 75% to about 95% (e.g., about 70% to about 90%). In other embodiments, the low force energy absorber 160 may be made from plastic.

Positioned toward a bottom 105 of the vehicle 100 in the vehicle vertical direction, may be a high force energy absorber 180 configured to impart a high force to an obstacle in the event of a collision. The high force energy absorber 180 may extend across the bumper assembly 130 in the vehicle lateral direction. The high force energy absorber 180 may be located beneath the grille 132 of the bumper cover 131 in the vehicle vertical direction. The high force energy absorber 180 may be made of any material designed to both absorb energy from an impact while imparting a hard force to the obstacle contacted during impact. For example, the high force energy absorber 180 may be made from plastic, foam, or the like. Due to the lower positioning of the high force energy absorber 180 compared to the low force energy absorber 160, during a collision, the high force energy absorber 180 may cause an obstacle to rotate away from the high force energy absorber 180, while the low force energy absorber 160 supports said rotation.

Figure 5A:
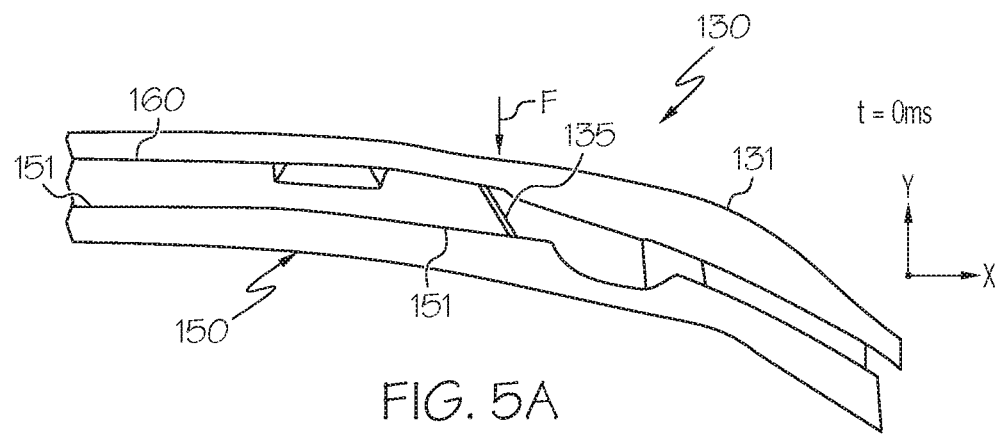
FIG. 5A schematically depicts the deformation of a bumper assembly during a collision at 0 ms, according to one or more embodiments shown and described herein.
Figure 5B:
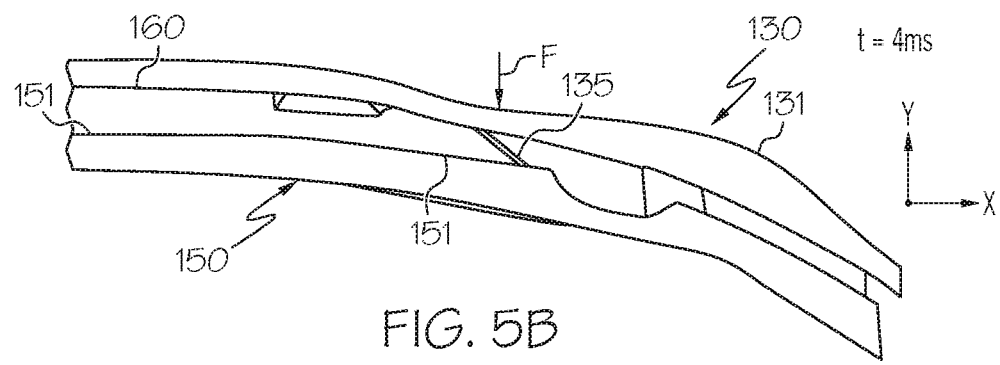
FIG. 5B schematically depicts the deformation of the bumper assembly of FIG. 5A during a collision at 4 ms, according to one or more embodiments shown and described herein.
Figure 5C:
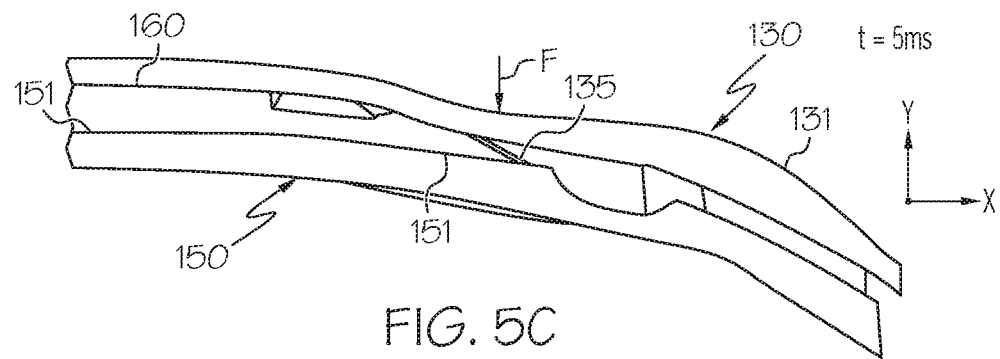
FIG. 5C schematically depicts the deformation of the bumper assembly of FIG. 5A during a collision at 5 ms, according to one or more embodiments shown and described herein.
Figure 5D:
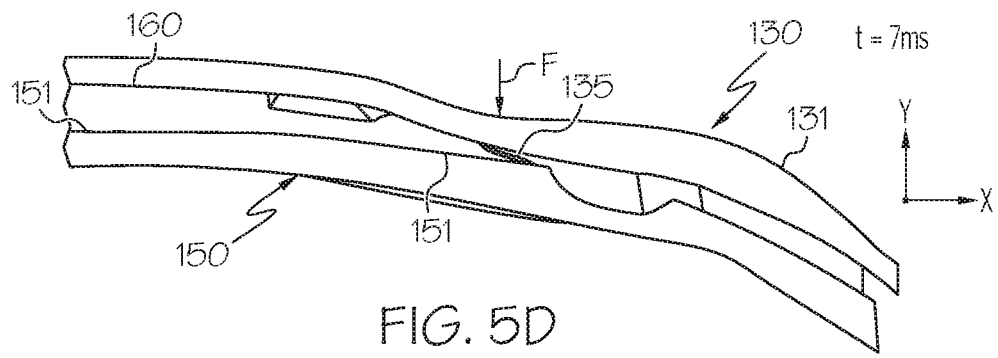
Figure 5E:
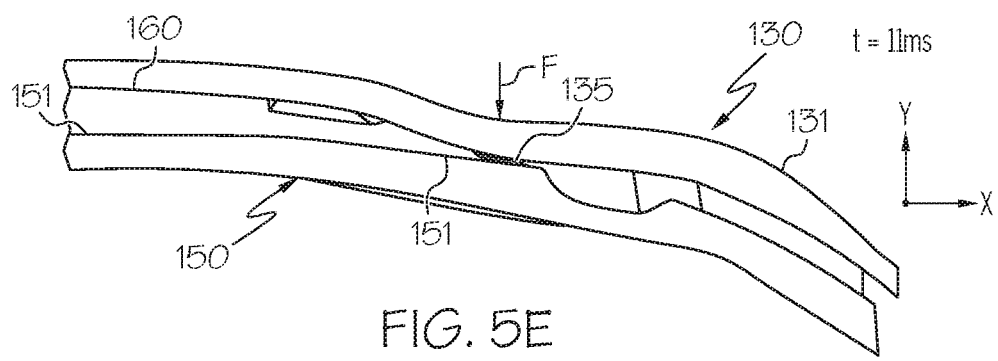

Referring now to FIGS. 5A-5E, a top view of the bumper assembly 130 including the bumper cover 131, the low speed bumper energy absorber 150, and the low force energy absorber 160 are depicted in isolation from the rest of the bumper assembly 130. A force F is illustrated to represent a force of a collision. FIG. 5A illustrates the impact of the force F at 0 ms. In FIG. 5B the bumper cover 131 is shown to be deforming under the application of the force F at 4 ms. The illustrated air deflector 135 is beginning to deform to absorb energy from an impact and slip passed the front face 151 of the low speed bumper energy absorber 150. At 5 ms, illustrated in FIG. 5C, the air deflector 135 has deformed more to allow the bumper cover 131 to move closer to the low speed bumper energy absorber 150. At 7 ms, illustrated in FIG. 5D, the air deflector 135 is almost flush or flattened between the bumper cover 131 and the front face 151 of the low speed bumper assembly 130. At 11 ms, the air deflector 135 is compressed between the bumper cover 131 and to low speed bumper energy absorber 150. As such, any impact (e.g., stack-up) caused by the presence of the air deflector 135 between the low speed bumper energy absorber 150 and the bumper cover 131 is minimized.

It should now be understood that embodiments of bumper assemblies and vehicle described herein describe a bumper cover that includes one or more integrated air deflectors. The one or more air deflectors substantially isolate a portion of the bumper assembly from air leakage through the bumper assembly. By substantially preventing air from passing through the bumper assembly in the vehicle lateral direction, air that enters the bumper assembly is forced to flow directly through a radiator of the vehicle instead of being diverted into other pathways provided by gaps within the bumper assembly. This may lead to greater efficiency in cooling an engine compartment of the vehicle and the components housed within the engine compartment.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A bumper assembly comprising:
a bumper cover comprising one or more air deflectors extending inward from the bumper cover;
a bumper reinforcement beam spaced apart from the bumper cover;
a low speed bumper energy absorber extending along a front surface of the bumper reinforcement beam between the bumper cover and the bumper reinforcement beam, wherein:
the one or more air deflectors extend from the bumper cover toward a front face of the low speed bumper energy absorber at an oblique angle relative to the front face of the low speed bumper energy absorber in a vehicle lateral direction to substantially isolate a portion of the bumper assembly from air leakage through the bumper assembly; and
a cross-section of the bumper assembly, taken parallel to a plane defined by the vehicle lateral direction and a vehicle longitudinal direction, passes through the one or more air deflectors and the low speed bumper energy absorber.

2. The bumper assembly of claim 1, wherein the bumper cover comprises a grille, and the one of the one or more air deflectors are positioned to at least one of a first side of the grille and a second side of the grille.

3. The bumper assembly of claim 2, wherein the one or more air deflectors comprise a first air deflector positioned to the first side of the grille in the vehicle lateral direction and a second air deflector positioned to the second side of the grille in the vehicle lateral direction.

4. The bumper assembly of claim 1, further comprising a low force energy absorber positioned below the low speed bumper energy absorber, wherein the low force energy absorber extends forward of the low speed bumper energy absorber toward the bumper cover.

5. The bumper assembly of claim 4, further comprising an upper air deflector extending above the one or more air deflectors of the bumper cover, wherein the one or more air deflectors extend between the low force energy absorber and the upper air deflector to contact the low force energy absorber and the upper air deflector.

6. The bumper assembly of claim 1, wherein the one or more air deflectors are molded into an interior surface of the bumper cover.

7. The bumper assembly of claim 1, wherein the one or more air deflectors are less than about 5 mm wide.

8. The bumper assembly of claim 1, wherein the one or more air deflectors are configured to deform to absorb energy from an impact and slip passed the front face of the low speed bumper energy absorber.

9. A vehicle comprising:
an engine compartment;
a radiator dividing the engine compartment into a hot section and a cool section;
a bumper assembly extending forward of the cool section in a vehicle longitudinal direction, the bumper assembly comprising:
 a bumper cover comprising one or more air deflectors extending inward from the bumper cover in the vehicle longitudinal direction;
 a bumper reinforcement beam positioned rearward of the bumper cover in the vehicle longitudinal direction; and
 a low speed bumper energy absorber extending along a front surface of the bumper reinforcement beam between the bumper cover and the bumper reinforcement beam, wherein:
  the one or more air deflectors extend from the bumper cover toward a front face of the low speed bumper energy absorber at an oblique angle relative to the front face of the low speed bumper energy absorber in a vehicle lateral direction to substantially isolate a portion of the bumper assembly from air leakage through the bumper assembly in the vehicle lateral direction, and
  a cross-section of the bumper assembly, taken parallel to a plane defined by the vehicle lateral direction and the vehicle longitudinal direction, passes through the one or more air deflectors and the low speed bumper energy absorber.

10. The vehicle of claim 9, wherein the bumper assembly further comprises a low force energy absorber positioned below the low speed bumper energy absorber in the vehicle lateral direction, wherein the low force energy absorber extends forward of the low speed bumper energy absorber in the vehicle longitudinal direction toward the bumper cover.

11. The vehicle of claim 10, wherein the bumper assembly further comprises an upper air deflector extending above the one or more air deflectors of the bumper cover, wherein the one or more air deflectors extend in a vehicle vertical direction between the low force energy absorber and the upper air deflector to contact the low force energy absorber and the upper air deflector.

12. The vehicle of claim 9, wherein the one or more air deflectors are less than about 5 mm wide in the vehicle lateral direction.

13. The vehicle of claim 9, wherein the bumper cover comprises a grille, and the one of the one or more air deflectors are positioned outboard of the grille.

14. The vehicle of claim 13, wherein the one or more air deflectors comprise a first air deflector positioned to a first side of the grille in the vehicle lateral direction and a second air deflector positioned to a second side of the grille in the vehicle lateral direction.

15. The vehicle of claim 9, wherein the one or more air deflectors are molded into an interior surface of the bumper cover.

16. The vehicle of claim 9, wherein the one or more air deflectors are configured to deform to absorb energy from an impact and slip passed the front face of the low speed bumper energy absorber.

17. A vehicle comprising:
an engine compartment;
a radiator dividing the engine compartment into a hot section and a cool section;
a bumper assembly extending forward of the cool section in a vehicle longitudinal direction, the bumper assembly comprising:
 a bumper cover comprising an air deflector extending inward from the bumper cover in the vehicle longitudinal direction;
 a headlamp, wherein the air deflector is positioned outboard of the radiator and inboard of the headlamp;
 a bumper reinforcement beam positioned rearward of the bumper cover in the vehicle longitudinal direction;
 a low speed bumper energy absorber extending along a front surface of the bumper reinforcement beam between the bumper cover and the bumper reinforcement beam, wherein:
  the air deflector extends from the bumper cover toward a front face of the low speed bumper energy absorber at an oblique angle relative to the front face of the low speed bumper energy absorber in a vehicle lateral direction to substantially isolate a portion of the bumper assembly from air leakage through the bumper assembly in the vehicle lateral direction; and
  a cross-section of the bumper assembly, taken parallel to a plane defined by the vehicle lateral direction and the vehicle longitudinal direction, passes through the air deflector and the low speed bumper energy absorber.

18. The vehicle of claim 17, further comprising a low force energy absorber positioned below the low speed bumper energy absorber in a vehicle vertical direction, wherein the low force energy absorber extends forward of the low speed bumper energy absorber in the vehicle longitudinal direction toward the bumper cover.

19. The vehicle of claim 18, wherein the bumper assembly further comprises an upper air deflector extending above the air deflector of the bumper cover, wherein the air deflector extends in the vehicle vertical direction between the low force energy absorber and the upper air deflector to contact the low force energy absorber and the upper air deflector.

20. The vehicle of claim 17, wherein the air deflector is configured to deform to absorb energy from an impact and slip passed the front face of the low speed bumper energy absorber.

* * * * *

UNITED STATES PATENT AND TRADEMARK OFFICE
CERTIFICATE OF CORRECTION

| | | |
|---|---|---|
| PATENT NO. | : 10,131,305 B2 | Page 1 of 1 |
| APPLICATION NO. | : 15/428827 | |
| DATED | : November 20, 2018 | |
| INVENTOR(S) | : Robert J. Marks et al. | |

It is certified that error appears in the above-identified patent and that said Letters Patent is hereby corrected as shown below:

In the Drawings

In Sheet 1 of 5, Fig 1, for negative X-axis, delete "+X", and insert -- -X--, therefor.

In the Specification

In Column 3, Line 53, after, "+/- vehicle" delete "V-direction", and insert --Y-direction--, therefor.

Signed and Sealed this
Twenty-sixth Day of February, 2019

Andrei Iancu
*Director of the United States Patent and Trademark Office*